Dec. 15, 1953  F. W. SWARD  2,662,511
AUTOMATIC MECHANICAL CLEARANCE REGULATOR
Filed April 10, 1951                                    2 Sheets-Sheet 1
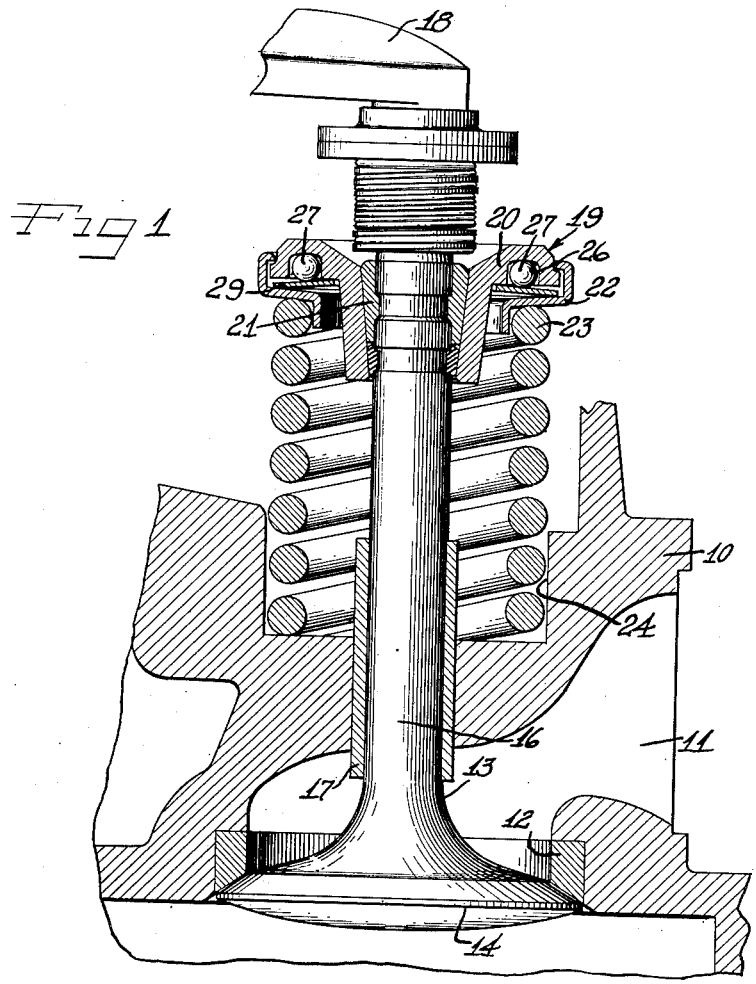
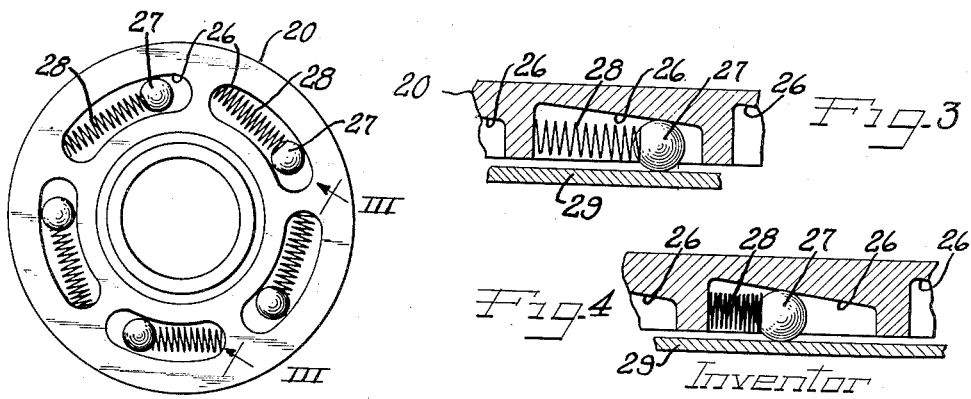
Inventor
Forrest Wayne Sward
by
Attys Dec. 15, 1953  F. W. SWARD  2,662,511
AUTOMATIC MECHANICAL CLEARANCE REGULATOR
Filed April 10, 1951  2 Sheets-Sheet 2
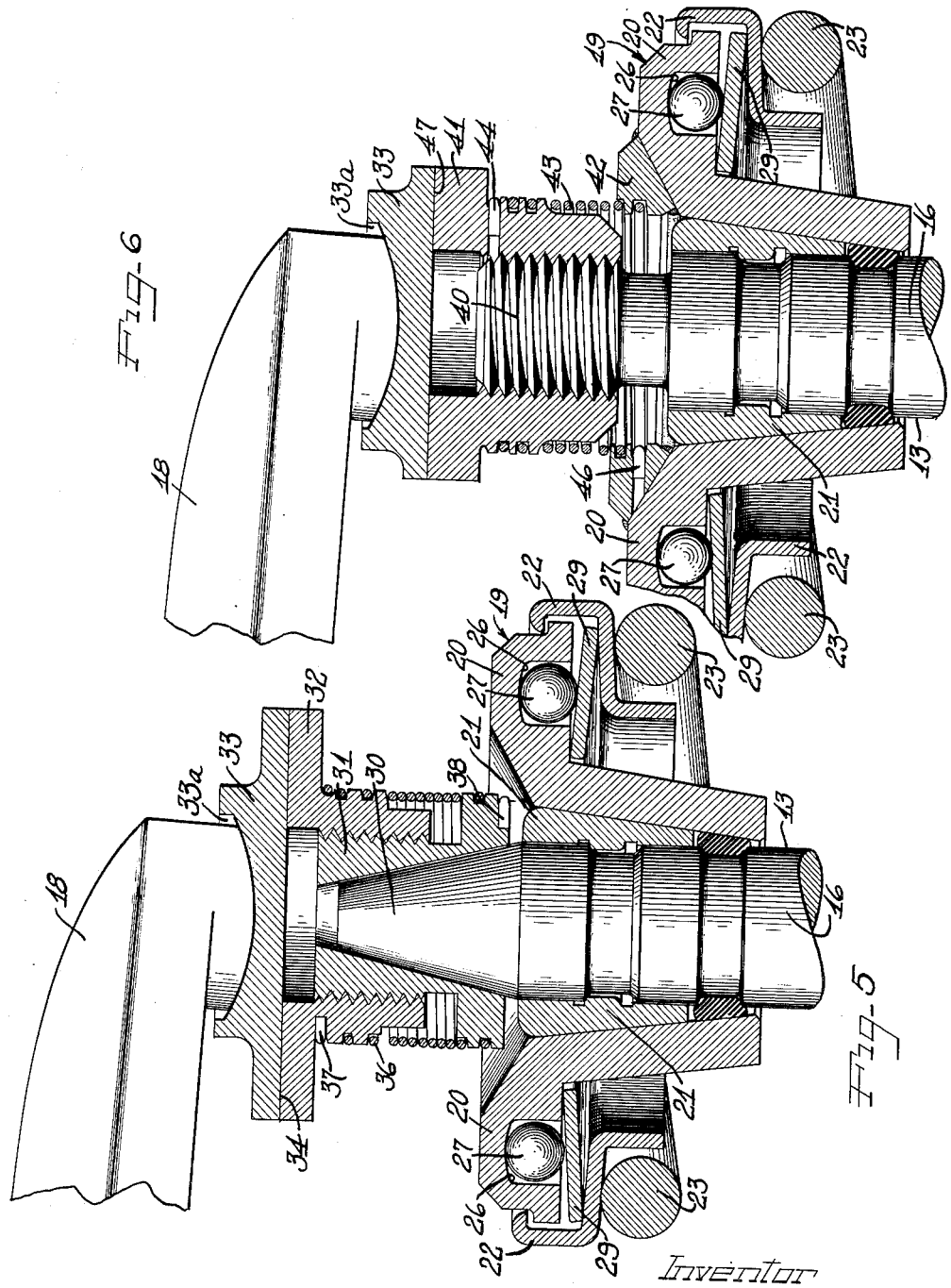
Inventor
Forrest Wayne Sward
by Hill, Sherman, Meroni, Gross & Simpson
Attys Patented Dec. 15, 1953

2,662,511

UNITED STATES PATENT OFFICE 2,662,511

AUTOMATIC MECHANICAL CLEARANCE REGULATOR

Forrest W. Sward, Euclid, Ohio, assignor to Thompson Products, Inc., Cleveland, Ohio, a corporation of Ohio Application April 10, 1951, Serial No. 220,215

10 Claims. (Cl. 123—90)

This invention relates generally to poppet valve assemblies and more particularly to an automatic mechanical clearance regulator for a poppet valve of the type having a length-adjusting means located between the poppet valve stem and the actuating means therefor to automatically adjust the effective length of the system by utilizing a valve rotating device associated therewith.

According to the general features of the present invention, a valve for a poppet valve engine is provided having an axially extending stem and a valve head adapted to be seated in an engine block or cylinder head. Means are provided to rotate the valve in response to axial loading of the stem during engine operation. Actuating means synchronized with the operation of the engine are also provided to load the stem end of the valve periodically and a length-adjusting means is situated between the end of the stem and the actuating means to adjust the effective length of the system by utilizing a valve rotating device associated therewith.

It is an object of the present invention, therefore, to provide an improved poppet valve assembly having an automatic valve clearance regulator.

A further object of the present invention is to provide a clearance regulator which will compensate for thermal expansion or contraction occurring singularly or simultaneously in the mechanism of a poppet valve assembly.

Yet another object of the present invention is to provide an improved structure for accommodating contraction and wear in the components of a poppet valve assembly by automatically regulating the axial clearance between a poppet valve actuator and the end of the stem of the poppet valve.

Many other advantages, features and additional objects of the present invention will become manifest to those versed in the art upon making reference to the detailed description which follows and the accompanying sheets of drawings, upon which a preferred embodiment of a poppet valve assembly structure incorporating the principles of the present invention is set forth.

On the drawings:

Figure 1 is a fragmentary cross-sectional view of an engine part having a poppet valve assembly according to the present invention associated therewith;

Figure 2 is a fragmentary enlarged view of a portion of the valve rotating device provided in the poppet valve assembly of the present invention;

Figure 3 is a fragmentary cross-sectional view with parts shown in elevation, taken substantially on line III—III of Figure 2;

Figure 4 is a view similar to Figure 3 but showing one of the ball elements of the rotating device positioned along the length of the raceway;

Figure 5 is an enlarged fragmentary cross-sectional view with parts shown in elevation of one embodiment on an automatic clearance regulator provided in accordance with the present invention; and Figure 6 is a view similar to Figure 5 but showing an alternative embodiment according to the principles of the present invention.

As shown on the drawings:

Although the principles of the present invention are generally applicable wherever it is necessary to control any axial clearance between relatively rotatable members, the clearance regulator of the present invention finds a particularly useful application when employed in connection with a poppet valve engine.

There is shown in Figure 1 an engine part 10 having a port 11 arranged to receive a seating insert 12, the port 11 being controlled by a poppet valve 13 having a head portion 14 seatable on the insert 12 and an axially extending stem portion 16 slidably supported in the engine part 10 by a valve guide or bushing insert 17 extending through a portion of the engine part 10.

The head portion 14 of the poppet valve 13 is moved away from the seating insert 12 periodically in accordance with the operation of the engine by means of a conventional actuating means including a rocker arm 18. It is believed that the details and construction of the actuating means are not necessary to the understanding of the principles of the present invention.

In order to impart a rotary motion periodically to the valve 13, a valve rotating device indicated generally by the reference numeral 19 is provided including a retainer body 20 secured in co-rotatable assembly with the valve stem 16 by a pair of semi-circular, axially tapered locks 21. A spring seating collar 22 shaped to embrace a portion of the retainer body 20 is provided and seats one end of a coil spring 23 employed conventionally to load the valve 13 on the insert seat 12. The other end of the spring 23 is received by a recess 24 provided in the engine part 10.

Referring to Figures 2 and 3, it will be noted that the body 20 is provided with a plurality of arcuate recesses 26 each seating a shiftable element such as a ball 27 resiliently urged towards one end of each of the recesses 26 by a spring 28. The recesses 26 are formed with an inclined bottom face providing a ramp or raceway upon which the shiftable elements or balls 27 may operate.

A resilient spring washer 29 is interposed between the retainer body 20 and the spring seating collar 22 and when the valve is in the closed position transmits the load from the spring 23, through the collar 22, to the retainer body 20 and thence to the valve 13, the outer peripheral edge of the spring washer engaging the collar 22 and the inner peripheral edge engaging the body 20.

Under increased spring loading, however, for example, when the valve 13 is being opened by the actuating means including the rocker arm 18, the spring washer 29 is bowed over the shiftable elements or balls 27 so that the increased spring loading will be transmitted to the body 20 through the balls 27, thereby tending to drive the balls toward the deeper end of the raceways defined by the recesses 26. This cooperation is to be clearly understood from referring to Figures 3 and 4 where a ball 27 is shown in a first position at the shallow end of the raceway and in a second position forced against the resilience of the spring 28 toward the deeper end of the raceway.

The transference of the load to the balls 27 operates to rotatively drive the body 20, the locks 21, and the valve 13 relative to the engine part 10.

In accordance with the principles of the present invention, a length adjusting means is located between the end of the stem 16 and the rocker arm 18 of the poppet valve actuating means. Referring first to the embodiment shown in Figure 5, it will be noted that the end of the stem 16 is provided with a tapered portion 30 which locks in firm assembly with an adjusting screw 31 having a complementally shaped bore, the adjusting screw 31 being externally threaded to receive in threaded relationship an adjusting nut 32.

A tip cup 33 is provided to cooperate with the rocker arm 18 of the actuating means. The tip cup 33, and the adjusting nut 32 are constructed to provide a flat engagement surface as at 34, thereby permitting rectilinear sliding movement of the tip cup 33 across the surface of the adjusting nut 32 whenever the rocker arm 18 is actuated to impart an axial thrust to the valve 13 through the stem 16. It may be noted that the tip cup 33 is restricted from rotating with respect to the rocker arm 18 by virtue of the trough-like cup 33a formed therein to receive the end of the rocker arm 18.

A torsion spring 36 is fastened to the adjusting nut 32 as at 37 and to the adjusting screw 31 as at 38, thereby to torsionally load the nut 32 relative to the screw 31 for producing extensive motion of the nut 32 relative to the adjusting screw 31 and the valve 13.

The force required to open the poppet valve 13 is transmitted from the rocker arm 18 to the tip cup 33 at the trough like cup 33c. The tip cup 33, in turn transmits the force to the adjusting nut 32 at the surface 34, after which the force is transmitted to the stem 16 of the poppet valve 13 through the adjusting screw 31.

When the valve is loaded and is being opened by the actuating means through the rocker arm 18, the stem 16, together with the adjusting screw 31, will move rotatably by action of the valve rotating device 19 relative to the adjusting nut 32 thereby causing the distance between the tip cup 33 and the stem 16 of the valve 13 to be decreased. The adjusting nut 32 is restrained from rotation by frictional face at the surface 34 when the valve is loaded.

When the valve returns to its normal seating position, the shortened valve gear will exhibit clearance between the components of the valve actuating apparatus so that the frictional force at the surfaces 34 will be substantially zero. Thus, the adjusting nut 32 will be rotated by the torsion spring 36, increasing the distance between the tip cup 33 and the stem 16 of the valve 13 and diminishing the clearance in the valve actuating assembly.

In the alternative embodiment of Figure 6, the stem 16 of the valve 13 is provided with a threaded portion 40 adapted to threadedly engage a similarly provisioned bore of an adjusting nut 41. A torsion spring anchor 42 is firmly connected to the cap 20 of the valve rotating device 19 and a torsion spring 43 is firmly connected at one end as at 44 to the adjusting nut 41 and at its other end to the torsion spring anchor 42 as at 46.

The tip cup 33 and the adjusting nut 41 are provided with a pair of mating flat surfaces as at 47.

With this structure, when the valve 13 is rotated, the distance between the rocker arm 18 and the stem 16 in the valve 13 will be decreased. Upon return of the valve 13 to its normal seating position, the shortened valve gear will exhibit clearance between the components thereof so that the frictional forces at the surfaces 47 will be substantially zero. The adjusting nut 41 will thus be rotated by the torsion effort of the torsion spring 43, whereupon the clearance between the components of the valve gear will be decreased.

Although various minor structural modifications might be suggested by those versed in the art, it should be understood that I wish to embody within the scope of this patent all such modifications as reasonably and properly come within the scope of my contribution to the art.

I claim as my invention:

1. In a poppet valve assembly, a poppet valve having a stem and a valve head adapted to be seated in an engine part, means to rotate said valve in response to axial loading thereof, actuating means to load the stem of said valve periodically, and a length-adjusting means between said stem and said actuating means comprising rotation responsive length decreasing elements, said elements being pre-loaded torsionally to increase in effective length when said valve is unloaded.

2. In a poppet valve assembly, a poppet valve having an axially extending stem and a valve head adapted to be seated in an engine part, means to rotate such valve in response to axial loading thereof, actuating means to load the stem end of such valve periodically, and a length adjusting means between said stem and said actuating means, said adjusting means including a threaded nut means between said actuating means and said stem adapted to be advanced axially relative to said valve in response to relative rotation between said valve and said actuating means.

3. In a poppet valve assembly, a poppet valve having a stem and a valve head adapted to be seated in an engine part, means to rotate said valve in response to axial loading thereof, actuating means to load the stem of said valve periodically, a length adjusting means between said stem and said actuating means to take up any axial clearance therebetween, said adjusting means including a threaded nut means between said actuating means and said stem adapted to be moved axially relative to said valve in response to relative rotation between said valve and said actuating means, and a torque producing biasing means between said threaded nut means and said valve to advance said adjusting nut means whenever an axial clearance exists between said stem and said actuating means.

4. In a poppet valve assembly, a poppet valve having a stem and a valve head adapted to be seated in an engine part, means to rotate said valve in response to axial loading thereof, actuating means to load the stem of said valve periodically, and a length-adjusting means between said stem and said actuating means comprising rotation responsive length decreasing elements, said elements being pre-loaded torsionally to increase in effective length when said valve is unloaded, said length adjusting means comprising an adjusting nut adapted to engage said actuating means and having an internally threaded bore, an adjusting screw adapted to be co-rotatably connected to said valve and having an externally threaded neck engageable in said bore and said torque producing biasing means comprising a torsion spring between said nut and said screw to produce a relative turning bias therebetween.

5. In a poppet valve assembly, a poppet valve having a stem and a valve head adapted to be seated in an engine part, means to rotate said valve in response to axial loading thereof, actuating means to load the stem of said valve periodically, and a length-adjusting means between said stem and said actuating means comprising rotation responsive length decreasing elements, said elements being pre-loaded torsionally to increase in effective length when said valve is unloaded, said length adjusting means comprising an adjusting nut adapted to engage said actuating means and having a bore to receive the end of said stem, thread means between said stem and said adjusting nut to advance said nut axially relative to said valve in response to relative rotation therebetween and said torque producing biasing means comprising a torsion spring between said adjusting nut and said valve to produce a relative turning bias therebetween.

6. In a poppet valve assembly of the type periodically loaded axially by actuating means and having a valve rotating mechanism to rotate the valve in response to axial loading thereof, the improvement of a rotation-responsive, length-adjusting means adapted to be operatively arranged between the actuating means and the valve to decrease the axial length of said means upon rotation of said valve, said length adjusting means having torsionally stressed elements to take up axial clearance upon unloading of said valve.

7. In a poppet valve assembly, a poppet valve having a stem and a valve head adapted to be seated in an engine part, a valve rotating device responsive to axial loading of said valve to angularly shift said valve rotatably, actuating means to load said stem and said valve periodically and a length-adjusting means between said stem and said valve and said actuating means comprising relatively rotatable screw members having a driven connection with said stem to decrease the length of said length-adjusting means upon rotation of said valve, and torsion means pre-loading said screw members to increase the length of said length-adjusting means when said valve is unloaded.

8. In a poppet valve assembly, a poppet valve having a stem and a valve head adapted to be seated in an engine part, means to rotate said valve in response to axial loading thereof, actuating means to load said stem of said valve periodically, and a length-adjusting means between said stem and said actuating means comprising rotation responsive length decreasing elements including a threaded adjusting screw connected to the end of said stem, and a complementary threaded adjusting nut engaging said screw, said nut having a flat surface slidably engaging said actuating means, said nut and said screw being pre-loaded torsionally to increase in effective length when said valve is unloaded.

9. In a poppet valve assembly, a poppet valve having a stem and a valve head adapted to be seated in an engine part, means to rotate said valve in response to axial loading thereof, actuating means to load said stem of said valve periodically, and a length-adjusting means between said stem and said actuating means comprising rotation responsive length decreasing elements including a nut threaded on said stem and having a flat surface slidably engaging said actuating means, said nut and said stem being pre-loaded torsionally to increase in effective length when said valve is unloaded.

10. In a poppet valve assembly, a poppet valve having a stem and a valve head adapted to be seated in an engine part, means to rotate said valve in response to axial loading thereof, actuating means to load said stem of said valve periodically, and a length-adjusting means between said stem and said actuating means comprising rotation responsive length decreasing elements including relatively rotatable screw members and a driven connection between said valve and said screw members decreasing the length of the length adjusting means upon rotation of said valve, and biasing means pre-loading said screw members and increasing the length of said length-adjusting means when the valve is unloaded.

FORREST W. SWARD.

References Cited in the file of this patent

UNITED STATES PATENTS

| Number | Name | Date |
|---|---|---|
| 1,134,695 | Meyers | Apr. 6, 1915 |
| 2,211,585 | Rushmore | Aug. 13, 1940 |
| 2,397,502 | Ralston | Apr. 2, 1946 |